(12) United States Patent
Seok

(10) Patent No.: US 10,651,977 B2
(45) Date of Patent: May 12, 2020

(54) DETECTING FORMAT OF DATA

(71) Applicant: TECHFLUX, LTD., Seojong-si (KR)

(72) Inventor: Yong H Seok, Irvine, CA (US)

( * ) Notice: Subject to any disclaimer, the term of this patent is extended or adjusted under 35 U.S.C. 154(b) by 0 days.

(21) Appl. No.: 15/390,621

(22) Filed: Dec. 26, 2016

(65) Prior Publication Data

US 2017/0111143 A1   Apr. 20, 2017

Related U.S. Application Data

(63) Continuation of application No. PCT/IB2015/001240, filed on Jun. 26, 2015.

(30) Foreign Application Priority Data

Jun. 27, 2014 (KR) .................. 10-2014-0080175

(51) Int. Cl.
| | | |
|---|---|---|
| *H04L 27/26* | (2006.01) | |
| *H04L 5/00* | (2006.01) | |
| *H04L 1/00* | (2006.01) | |
| *H04W 84/12* | (2009.01) | |
| *H04L 25/02* | (2006.01) | |

(52) U.S. Cl.
CPC ........ *H04L 1/0091* (2013.01); *H04L 25/0202* (2013.01); *H04L 27/2602* (2013.01); *H04L 27/266* (2013.01); *H04W 84/12* (2013.01)

(58) Field of Classification Search
CPC .............. H04W 72/1263; H04W 84/12; H04L 1/0091; H04L 25/0202; H04L 27/2602; H04L 27/266; H04L 25/0208; H04L 25/024; H04L 25/0242; H04L 5/0053; H04B 7/0452; H04B 7/0456; H04B 7/0684

See application file for complete search history.

(56) References Cited

U.S. PATENT DOCUMENTS

| | | | | |
|---|---|---|---|---|
| 8,437,440 | B1 * | 5/2013 | Zhang ................... | H04L 1/0625 375/366 |
| 8,462,863 | B1 * | 6/2013 | Zhang ................. | H04L 27/2613 375/260 |
| 8,693,356 | B2 * | 4/2014 | Wu ...................... | H04L 25/0226 370/252 |
| 8,718,173 | B2 * | 5/2014 | Lee ....................... | H04B 7/0452 375/259 |
| 8,724,546 | B2 * | 5/2014 | Zhang .................. | H04B 7/0669 370/328 |
| 9,247,579 | B1 * | 1/2016 | Zhang ................... | H04L 1/0625 |
| 9,559,887 | B2 * | 1/2017 | Lee ....................... | H04B 7/0452 |
| 9,614,707 | B1 * | 4/2017 | Zhang ................... | H04L 1/0625 |
| 9,706,599 | B1 * | 7/2017 | Zhang ................... | H04W 84/12 |
| 9,716,574 | B2 * | 7/2017 | Kang .................... | H04L 5/0048 |
| 2010/0054223 | A1 * | 3/2010 | Zhang ............... | H04L 25/03343 370/338 |
| 2016/0165483 | A1 * | 6/2016 | Noh ....................... | H04L 5/0023 370/329 |
| 2016/0353370 | A1 * | 12/2016 | Choi ................... | H04L 27/2613 |
| 2017/0170937 | A1 * | 6/2017 | Chun ..................... | H04L 5/0048 |

* cited by examiner

*Primary Examiner* — Ahmed Elallam

(57) ABSTRACT

A method for detecting a format of data in a wireless local area network and a device using the same are provided. The device receives a physical layer protocol data unit (PPDU) that includes a first field and a second field. The device determines a first format of the PPDU based on at least one of the first field and the second field and determines a second format of the PPDU based on a modulation phase of the PPDU.

10 Claims, 7 Drawing Sheets

| ST field | Channel Estimation | Legacy Header | DATA Symbol | ...... | DATA Symbol | AGC sub fields | TRN-R/T subfields |

FIG. 4

DETECTING FORMAT OF DATA

CROSS-REFERENCE TO RELATED APPLICATIONS

The present application is a Continuation Application (Bypass Continuation Application) of a currently pending international application No. PCT/IB2015/001240 having an international filing date of 26 Jun. 2015 and designating the United States, the international application claiming priority to the following earlier filed Korean patent application No. 10-2014-0080175 filed on Jun. 27, 2014. The entire contents of the aforesaid international application and the afore-listed Korean patent applications are incorporated herein by reference. The applicant claims the benefit of and claims priory herein to the aforesaid international application and the afore-listed Korean patent applications and their filing dates and priority dates.

BACKGROUND OF THE INVENTION

Field of the Invention

The present invention relates to wireless communications, and more particularly, to a method for detecting a format of data in a wireless local area network and a device using the same.

Related Art

Institute of Electrical and Electronics Engineers (IEEE) 802.11n standard established in 2009 provides a transfer rate of up to 600 Mbps at a frequency band of 2.4 GHz or 5 GHz on the basis of Multiple Input Multiple Output (MIMO) technique.

IEEE 802.11ac standard established in 2013 aims to provide a throughput greater than or equal to 1 Gbps utilizing Medium Access Control (MAC) Service Access Point (SAP) layer scheme at a frequency band less than or equal to 6 GHz. A system supporting IEEE 802.11ac standard is referred to as a Very High Throughput (VHT) system.

There are continuing efforts to implement more effective Wireless Local Area Network (WLAN) technologies in increasingly congested environments.

SUMMARY OF THE INVENTION

The present invention provides a method for detecting a format of data in a wireless local area network.

The present invention also provides a device for detecting a format of data in a wireless local area network.

In an aspect, a method for detecting a format of data in a wireless local area network is provided. The method includes receiving, by a receiving station, a physical layer protocol data unit (PPDU) from a transmitting station, the PPDU including a first field and a second field, determining a first format of the PPDU based on at least one of the first field and the second field, and determining a second format of the PPDU based on a modulation phase of the PPDU.

The first format of the PPDU may include a single carrier (SC) PPDU and a non-SC PPDU.

The second format of the PPDU may be determined when the first format of the PPDU is determined as the non-SC PPDU.

The second format of the PPDU may include a multiple input multiple output (MIMO) PPDU and a non-MIMO PPDU.

In another aspect, a device configured for detecting a format of data in a wireless local area network is provided. The device includes a radio frequency module configured to transmit and receive radio signals, and a processor operatively coupled with the radio frequency module. The processor is configured to instruct the radio frequency module to receive a physical layer protocol data unit (PPDU) from a transmitting station, the PPDU including a first field and a second field, determine a first format of the PPDU based on at least one of the first field and the second field, and determine a second format of the PPDU based on a modulation phase of the PPDU.

Multiple input multiple output (MIMO) can be applied over high frequency bands.

BRIEF DESCRIPTION OF THE DRAWINGS

FIG. 4 shows a DMG OFDM PPDU format.

DESCRIPTION OF EXEMPLARY EMBODIMENTS

The proposed Wireless Local Area Network (WLAN) system may operate at a band greater than or equal to 45 GHz.

For clarity, a system conforming to an Institute of Electrical and Electronics Engineers (IEEE) 802.11 a/g standard is called a non-High Throughput (HT) system, a system conforming to an IEEE 802.11n standard is called a High Throughput (HT) system, and a system conforming to an IEEE 802.11ac standard is called a Very High Throughput (VHT) system. In comparison thereto, a WLAN system confirming to the proposed method is called a Directional Multi-Gigabit (DMG) system.

A DMG Multiple Input Multiple Output (MIMO) Orthogonal Frequency Division Multiplexing (OFDM) system is a system for providing performance of tens of Gbps by combining a directional antenna and MIMO and OFDM at a high frequency band greater than or equal to 45 GHz.

Hereinafter, unless a function of a Station (STA) is additionally distinguished from a function of an Access Point (AP), the STA may include a non-AP STA or the AP. When it is described as an STA-to-AP communication, the STA may be interpreted as the non-AP STA, and may correspond to communication between the non-AP STA and the AP. When it is described as STA-to-STA communication or when a function of the AP is not additionally required, the STA may be the non-AP STA or the AP.

Figure 1:
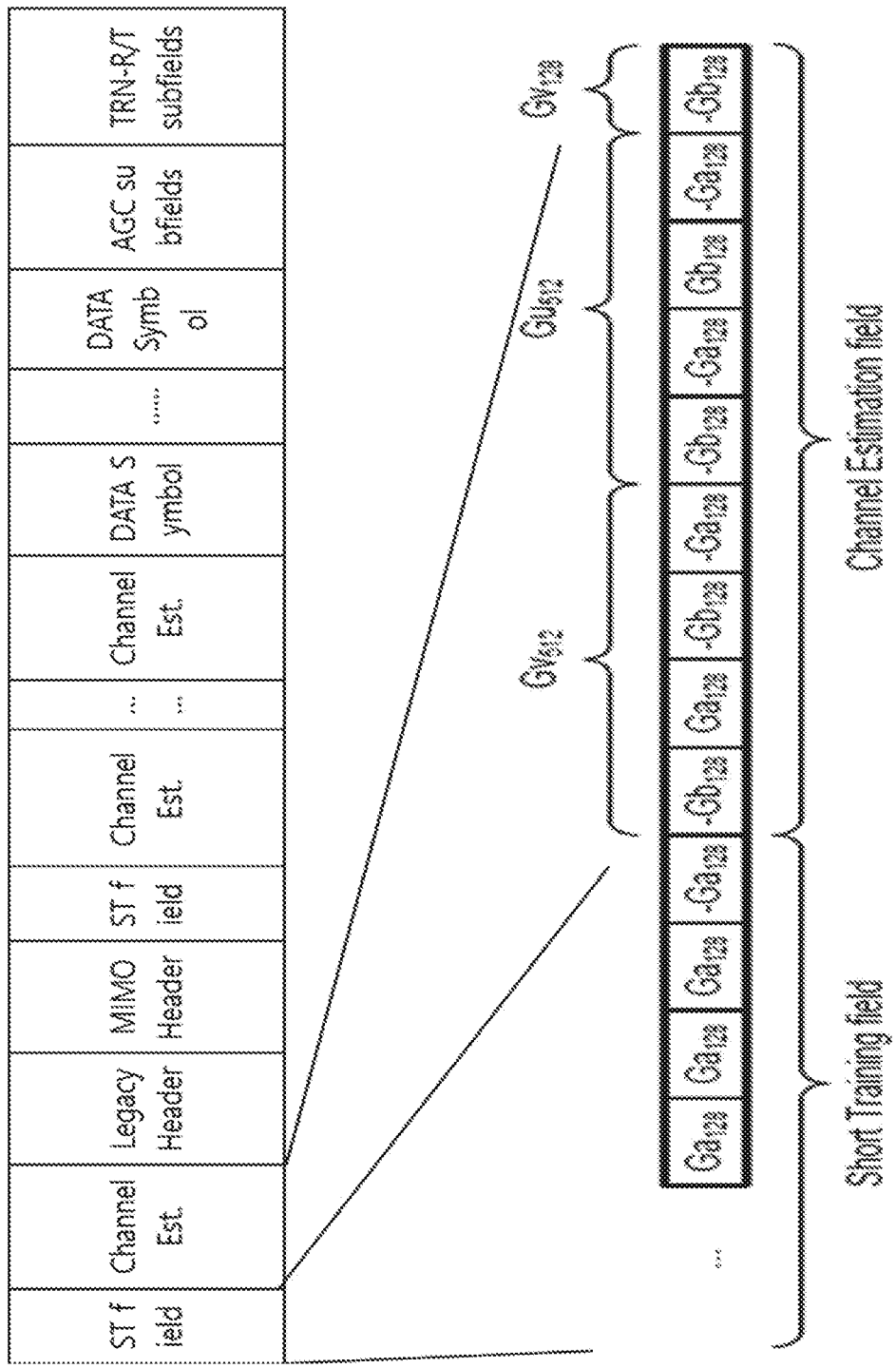
FIG. 1 shows a Physical Layer Protocol Data Unit (PPDU) format according to an embodiment of the present invention.

FIG. 1 shows a Physical Layer Protocol Data Unit (PPDU) format according to an embodiment of the present invention. This may be called as a DMG MIMO OFDM PPDU format.

A Short Training (ST) field and a Channel Estimation (CE) field are used for frequency offset estimation and channel estimation.

A time domain waveform equation for the ST field is as follows.

$$r_{STF}(nT_c) = \begin{cases} (Ga_{128}(n \bmod 128))\exp\left(j\pi\frac{n}{2}\right) \\ \quad n = 0, 1, \ldots, 16 \times 128 - 1 \\ (-Ga_{128}(n \bmod 128))\exp\left(j\pi\frac{n}{2}\right) \\ \quad n = 16 \times 128, \ldots, 17 \times 128 - 1 \end{cases} \quad \text{[Equation 1]}$$

A time domain waveform equation for the channel estimation field is as follows.

$$r_{CE_{OFDM}}(nT_c) = \quad \text{[Equation 2]}$$
$$(Gv_{512}(n) + Gu_{512}(n-512) + Gu_{512}(n-1024))\exp\left(j\pi\frac{n}{2}\right),$$
$$n = 0, 1, \ldots, 1151$$

$Ga_{128}$ and $Gb_{128}$ Golay sequences constituting the ST field and the channel estimation field are as follows.

TABEL 1

The Sequence $Ga_{128}(n)$, to be transmitted from left to right, up to down

+1 +1 −1 −1 −1 −1 −1 −1 −1 +1 −1 +1 +1 −1 −1 +1 +1 +1 −1 −1 +1 +1 +1 +1 −1 +1 −1 +1 −1 +1
+1 −1 −1 −1 −1 +1 +1 +1 +1 +1 +1 −1 −1 −1 +1 +1 −1 −1 −1 −1 +1 +1 −1 −1 +1 +1 −1 +1 −1 +1
−1 +1 +1 −1 +1 +1 −1 −1 −1 −1 −1 −1 +1 −1 +1 +1 −1 −1 +1 +1 +1 −1 −1 +1 +1 +1 +1 −1 +1
−1 +1 −1 +1 +1 −1 +1 +1 −1 −1 −1 −1−1 −1 −1 +1 −1 +1 +1 −1 −1 +1 −1 −1 +1 +1 −1 −1 −1 −1 +1
−1 +1 −1 +1 −1 −1 +1

TABLE 2

The Sequence $Gb_{128}(n)$, to be transmitted from left to right, up to down

−1 −1 +1 +1 +1 +1 +1 +1 +1 −1 +1 −1 −1 +1 +1 −1 −1 −1 +1 +1 −1 −1 −1 −1 +1 −1 +1 −1 +1 −1
−1 +1 +1 +1 −1 −1 −1 −1 −1 −1 +1 −1 +1 +1 −1 −1 +1 −1 −1 +1 +1 −1 −1 −1 −1 +1 −1 +1 −1 +1
−1 −1 +1 +1 +1 −1 −1 −1 −1 −1 −1 +1 −1 +1 +1 −1 −1 +1 +1 +1 −1 −1 +1 +1 +1 +1 −1 +1 −1 +1
−1 +1 +1 −1 +1 +1 −1 −1 −1 −1 −1 −1 +1 −1 +1 +1 −1 −1 +1 −1 −1 +1 +1 −1 −1 −1 −1 +1 −1 +1
−1 +1 −1 −1 +1

The Channel Estimation field also has a purpose of preamble detection to coexist with other DMG Physical layer (PHY) protocols in addition to the purpose of channel estimation.

Among DMG PHY protocols, a DMG Single Carrier (SC) PPDU supports robust transmission in a low Signal-to-Noise Ratio (SNR) environment by using a single carrier.

Figure 2:
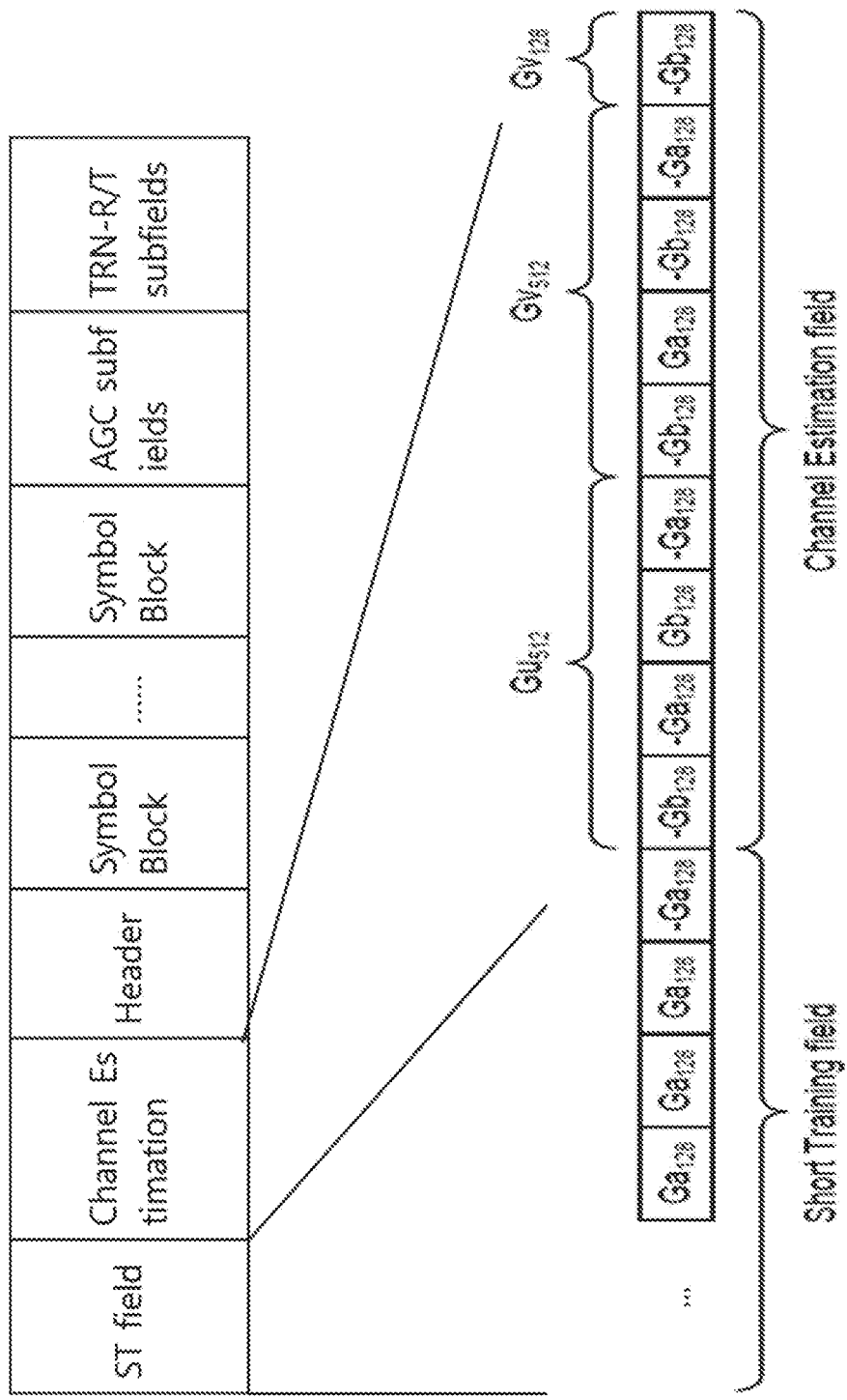
FIG. 2 shows a DMG SC PPDU format.

FIG. 2 shows a DMG SC PPDU format.

A channel estimation field of a DMG SC PPDU is configured by the concatenation of $Gu_{512}$ and $Gv_{512}$. However, a Channel Estimation field of a DMG (MIMO) OFDM PPDU is configured by the concatenation of $Gv_{512}$ and $Gu_{512}$.

If an STA receives a PPDU and decodes an ST field and a channel estimation field, a receiver STA may identify a format of the PPDU (e.g., a DMG SC PPDU, a DMG (MIMO) or OFDM PPDU) through the configuration of the Channel Estimation field.

Two types of Header are included in the DMG MIMO OFDM PPDU format. A first Header may be called as a Legacy Header, and includes OFDM signaling information for an STA not supporting MIMO OFDM. A second Header may be called as a MIMO Header, and includes MIMO OFDM signaling information for an STA supporting MIMO OFDM.

Figure 3:
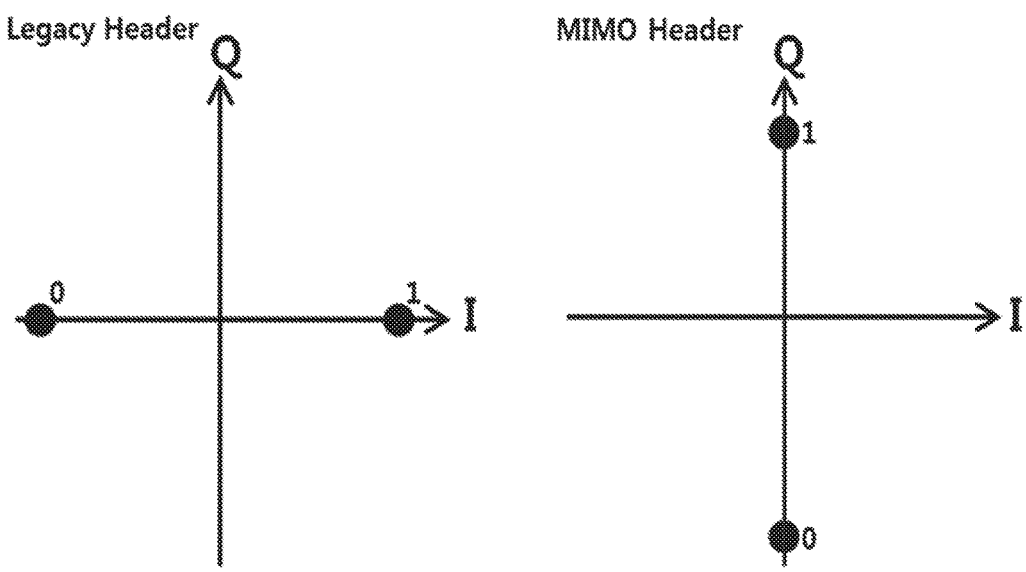
FIG. 3 shows a phase difference between a Legacy Header and a MIMO Header.

FIG. 3 shows a phase difference between a Legacy Header and a MIMO Header.

In an OFDM symbol used for a MIMO Header, a phase modulation is achieved by 90 degrees with respect to a phase modulation of an OFDM symbol used for a Legacy Header. In doing so, a receiver STA can identify a DMG OFDM PPDU and a DMG MIMO OFDM PPDU. Herein, the DMG OFDM PPDU is a Single Input Single Output (SISO) OFDM PPDU which does not use MIMO.

FIG. 4 shows a DMG OFDM PPDU format.

For example, if an STA receives any PPDU, whether a DMG PHY type is a DMG SC PPDU or a DMG (MIMO) OFDM PPDU is primarily identified by decoding an ST field and a Channel Estimation field. If the DMG PHY type is the DMG (MIMO) OFDM PPDU, whether a corresponding PPDU is a DMG OFDM PPDU or a DMG MIMO OFDM PPDU is clearly identified by using a phase difference of two OFDM symbols transmitted after the Channel Estimation field. In addition, if the corresponding PPDU is the DMG MIMO OFDM PPDU, then Legacy Header, MIMO Header, Short Training field, and Channel Estimation field are sequentially decoded. Information regarding the number of Channel Estimation fields to be transmitted is included in the MIMO Header.

Two kinds of formats for the received PPDU can be determined. First, a first format of the PPDU may be determined based on the ST field and the Channel Estimation field. The first format of the PPDU includes a DMG SC PPDU and DMG non-SC PPDU. According to the ST field and the Channel Estimation field, the STA can determined that the first format of the received PPDU is the DMG SC PPDU or the DMG non-SC PPDU. If the first format of the received PPDU is the DMG non-SC PPDU, the STA may determine a second type of the PPDU based on modulation phase of the PPDU. Whether the received PPDU is a DMG OFDM PPDU or a DMG MIMO OFDM PPDU may be identified by using a phase difference of two OFDM symbols transmitted after the Channel Estimation field.

Each of the Legacy Header and the MIMO Header is transmitted in one OFDM symbol.

A field included in the Legacy Header is shown in the following table. Filed names and the number of bits are exemplary purpose only.

TABLE 3

| Filed name | Number of bits | Description |
|---|---|---|
| Scrambler Initialization | 7 | Bits X1-X7 of the initial scrambler state. |
| MCS | 5 | Index into the Modulation and Coding Scheme (MCS) table. |
| Length | 18 | Number of data octets in the Phyiscal layer Service Data Unit (PSDU). Range 1-262143. |
| Additional PPDU | 1 | Contains a copy of the parameter ADD-PPDU from the TXVECTOR. A value of 1 indicates that this PPDU is immediately followed by another PPDU with no IFS or preamble on the subsequent PPDU. A value of 0 indicates that no additional PPDU follows this PPDU. |
| Packet Type | 1 | |
| Training Length | 5 | Corresponds to the TXVECTOR parameter TRNLEN. If the Beam Tracking Request field is 0, the Training Length field indicates the length of the training field. A value of 0 indicates that no training field is present in this PPDU. If the Beam Tracking Request field is 1 and the Packet Type field is 1, the Training Length field indicates the length of the training field appended to this PPDU. If the Packet Type field is 0, the Training Length field indicates the length of the training field requested for receive training. |
| Aggregation | 1 | Set to 1 to indicate that the PPDU in the data portion of the packet contains an A-MPDU; otherwise, set to 0. |
| Beam Tracking Request | 1 | Corresponds to the TXVECTOR parameter BEAM_TRACKING_REQUEST. Set to 1 to indicate the need for beam tracking; otherwise, set to 0. The Beam Tracking Request field is reserved when the Training Length field is 0. |
| Tone Pairing Type | 1 | Set to 0 to indicate Static Tone Pairing; Set to 1 to indicate Dynamic Tone Pairing. Only valid if MCS field value is in the range of 13 to 17; otherwise reserved. |
| DTP Indicator | 1 | Bit flip used to indicate DTP update. Only valid when the Tone Pairing Type field is 1 and the MCS field value is in the range of 13 to 17; otherwise reserved. |
| Last RSSI | 4 | Contains a copy of the parameter LAST_RSSI from the TXVECTOR. When set to 0, this field is reserved and ignored by the receiver. The value is an unsigned integer: Values of 2 to 14 represent power levels (−71 + value × 2) dBm. A value of 15 represents a power greater than or equal to −42 dBm. A value of 1 represents a power less than or equal to −68 dBm. Value of 0 indicates that the previous packet was not received a SIFS period before the current transmission. |
| Turnaround | 1 | |
| Reserved | 2 | |
| HCS | 16 | Header check sequence. |

The MIMO Header includes information about a number of space time streams and includes signaling information required for a MIMO operation.

However, if the supported number of space time streams is less than or equal to 4, the DMG MIMO OFDM PPDU may be configured by excluding the MIMO Header and by including the number of space time streams into the Legacy Header.

Figure 5:
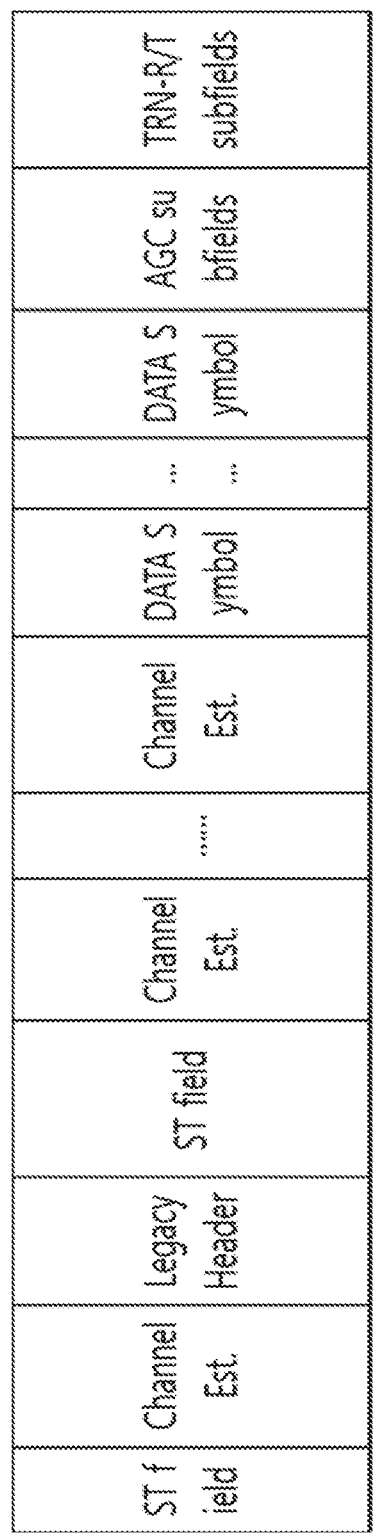
FIG. 5 shows a DMG MIMO OFDM PPDU according to another embodiment of the present invention.

FIG. 5 shows a DMG MIMO OFDM PPDU according to another embodiment of the present invention.

An ST field and a Channel Estimation field, which are transmitted after a Legacy Header and a MIMO Header, are for channel estimation for a plurality of space time streams.

The number $N_{CE}$ of Channel Estimation fields to be transmitted on the basis of the number of space time streams is as follows.

TABLE 4

| Number of Space Time Streams | Number of Channel Estimation fields ($N_{CE}$) |
|---|---|
| 1 | 1 |
| 2 | 2 |
| 3 | 4 |
| 4 | 4 |
| 5 | 6 |
| 7 | 8 |
| 8 | 8 |

When a plurality of Channel Estimation fields are transmitted, it is assumed that, for example, the Number of Space Time Streams is 4, and thus 4 Channel Estimation fields are transmitted. In this case, the respective Channel Estimation fields are called CE1, CE2, CE3, and CE4. In order to increase Channel Estimation performance by providing orthogonality for the CE1, the CE2, the CE3, and the CE4, it is proposed to perform transmission by multiplying a Channel Estimation sequence by a matrix corresponding to $N_{CE}$ columns.

The following table shows a matrix by which the Channel Estimation sequence is multiplied when $N_{CE}=4$.

TABLE 5

| | | | |
|---|---|---|---|
| 1 | −1 | 1 | 1 |
| 1 | 1 | −1 | 1 |
| 1 | 1 | 1 | −1 |
| −1 | 1 | 1 | 1 |

The following table shows a matrix by which the Channel Estimation sequence is multiplied when $N_{CE}=6$.

TABLE 6

| | | | | | |
|---|---|---|---|---|---|
| 1 | −1 | 1 | 1 | 1 | −1 |
| 1 | $-W^1$ | $W^2$ | $W^3$ | $W^4$ | $-W^5$ |
| 1 | $-W^2$ | $W^4$ | $W^6$ | $W^8$ | $-W^{10}$ |
| 1 | $-W^3$ | $W^6$ | $W^9$ | $W^{12}$ | $-W^{15}$ |
| 1 | $-W^4$ | $W^8$ | $W^{12}$ | $W^{16}$ | $-W^{20}$ |
| 1 | $-W^5$ | $W^{10}$ | $W^{15}$ | $W^{20}$ | $-W^{25}$ |

The following table shows a matrix by which the Channel Estimation sequence is multiplied when $N_{CE}=8$.

TABLE 7

| | | | | | | | |
|---|---|---|---|---|---|---|---|
| 1 | −1 | 1 | 1 | 1 | −1 | 1 | 1 |
| 1 | 1 | −1 | 1 | 1 | 1 | −1 | 1 |
| 1 | 1 | 1 | −1 | 1 | 1 | 1 | −1 |
| −1 | 1 | 1 | 1 | −1 | 1 | 1 | 1 |
| 1 | −1 | 1 | 1 | −1 | 1 | −1 | −1 |
| 1 | 1 | −1 | 1 | −1 | −1 | 1 | −1 |
| 1 | 1 | 1 | −1 | −1 | −1 | −1 | 1 |
| −1 | 1 | 1 | 1 | 1 | −1 | −1 | −1 |

A DATA field is transmitted through MIMO modulation by the Number of Space Time Streams, and thereafter an AGC subfield and a TRN-R/T subfield are selectively transmitted for the purpose of beam-forming.

The AGC subfield and the TRN-R/T subfield are transmitted for the purpose of beam-forming. However, when the beam-forming is performed for a plurality of space time streams, $N_{CE}$ Channel Estimation (CE) fields required for the plurality of space time streams desired to be transmitted are included in the AGC subfield and the TRN-R/T subfield, and in this case, each of the CE fields is transmitted by being multiplied by an $N_{CE}$ column matrix.

Figure 6:
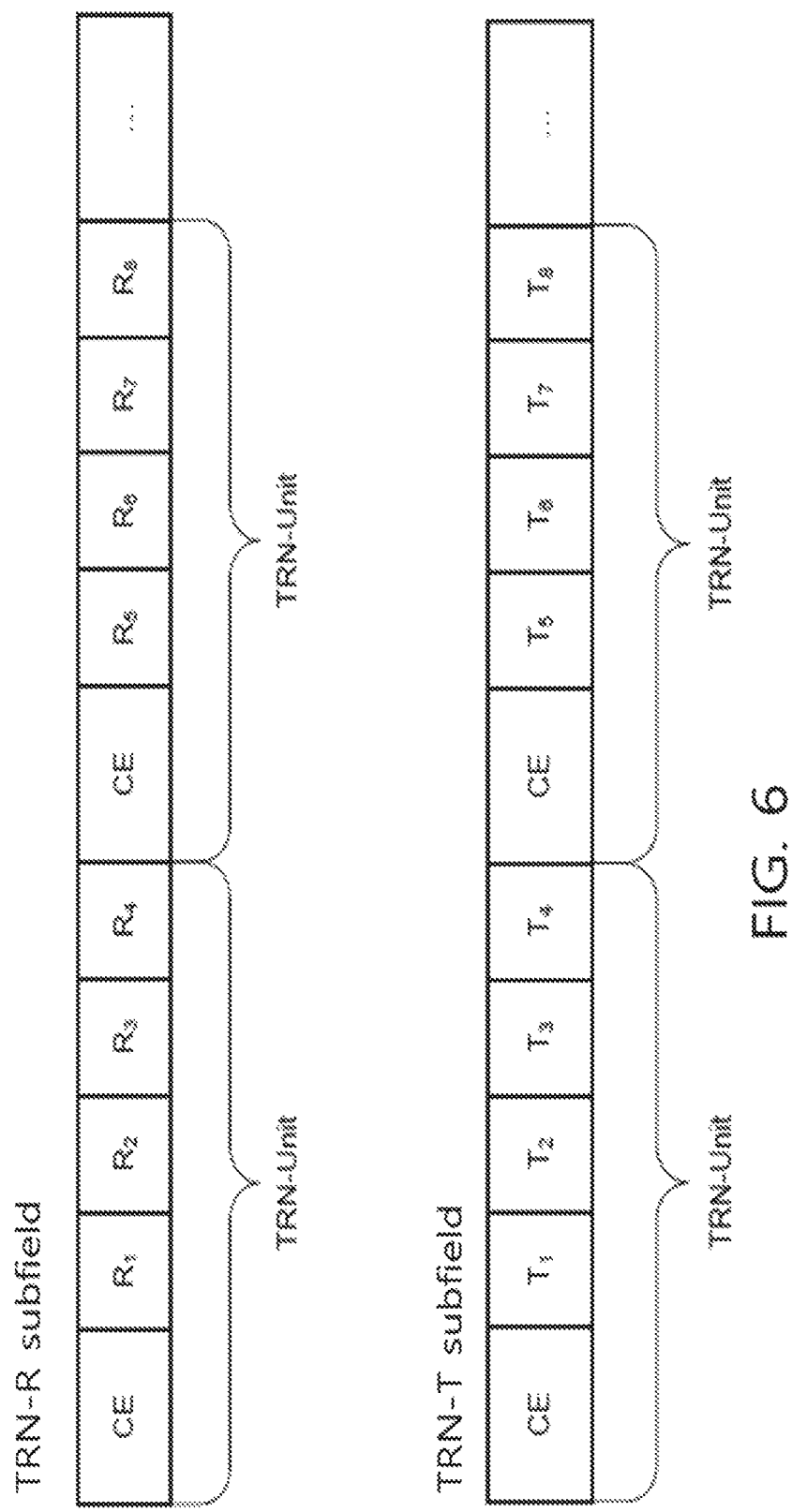
FIG. 6 shows a format of a TRN-R subfield and a TRN-T subfield.

FIG. 6 shows a format of a TRN-R subfield and a TRN-T subfield.

The TRN-R subfield consists of a plurality of TRN-Units. In this case, one TRN-Unit consists of 1 Channel Estimation (CE) field and 4 TRN values. However, if beam-forming is performed for a plurality of space time streams, $N_{CE}$ CE fields required for the plurality of space time streams desired to be beam-formed are included in the TRN-Unit. In this case, each of the CE fields is transmitted by being multiplied by $N_{CE}$ column matrix.

If the beam-forming is performed for one space time stream, one CE included in the TRN-Unit may be multiplied by a matrix of a column vector 1 and then may be transmitted through multiple antennas.

The TRN-T subfields consist of a plurality of TRN-Units. In this case, one TRN-Unit consists of 1 CE field and 4 TRN values. However, if beam-forming is performed for a plurality of space time streams, $N_{CE}$ CE fields required for the plurality of space time streams desired to be beam-formed are included in the TRN-Unit. In this case, each of the CE fields is transmitted by being multiplied by $N_{CE}$ column matrix.

If the beam-forming is performed for one space time stream, one CE included in the TRN-Unit may be multiplied by a matrix of a column vector 1 and then may be transmitted through multiple antennas.

Figure 7:
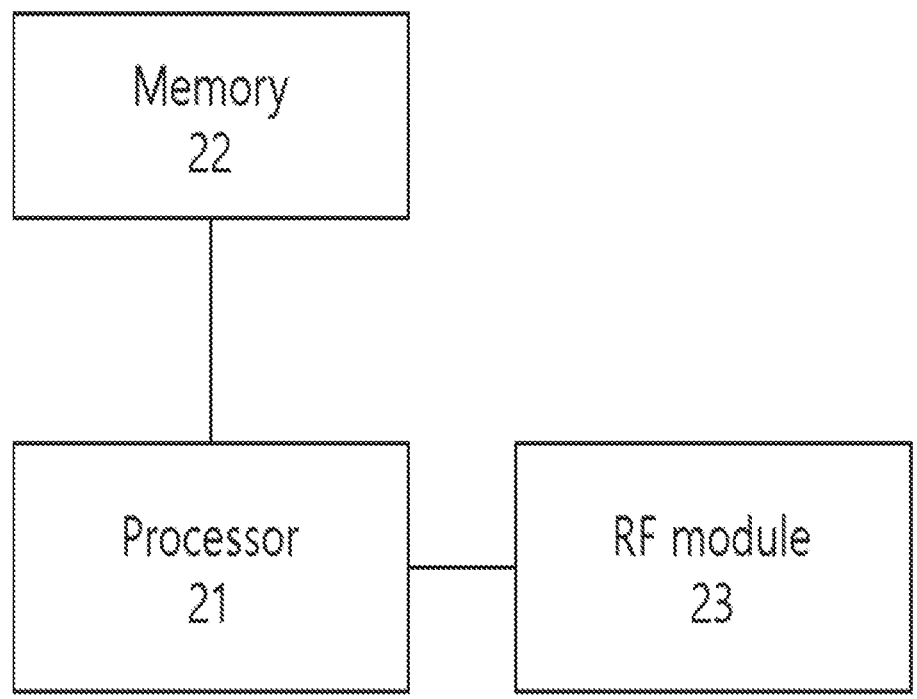
FIG. 7 is a block diagram of an STA according to an embodiment of the present invention.

FIG. 7 is a block diagram of an STA according to an embodiment of the present invention.

The STA may include a processor 21, a memory 22, and a Radio Frequency (RF) module 23.

The processor 21 implements an operation of the STA according to the embodiment of the present invention. The processor 21 may generate a PPDU according to an embodiment of the present invention and may instruct the RF module 23 to transmit the PPDU. The memory 22 stores instructions for the operation of the processor 21. The stored instructions may be executed by the processor 21 and may be implemented to perform the aforementioned operation of the STA. The RF module 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a physical layer protocol data unit (PPDU) in a wireless local area network, the method comprising:
   generating a PPDU, the PPDU comprising a first short training (ST) field, a first channel estimation (CE) field, a header field, a second ST field, a second CE field, a data field and a training (TRN) field; and
   transmitting the PPDU,
   wherein the header field comprises a stream field indicating a number of spatial streams, wherein the second CE field comprises a number of symbols, the number of symbols for the second CE field determined based on the number of spatial streams of the header field, wherein the second CE field generated from a first mapping matrix, the first mapping matrix having a number of columns, the number of columns corresponding to the number of symbols for the second CE field, wherein the TRN field comprises a plurality of TRN subfields, each TRN subfield comprising a number of symbols, each TRN subfield generated from a second mapping matrix having a number of columns, the number of columns of the second mapping matrix corresponding to the number of symbols of each TRN subfield.

2. The method of claim 1, wherein the number of spatial streams is four, and the first mapping matrix is $$\begin{bmatrix} +1 & -1 & +1 & +1 \\ +1 & +1 & -1 & +1 \\ +1 & +1 & +1 & -1 \\ -1 & +1 & +1 & +1 \end{bmatrix}.$$

3. The method of claim 1, wherein the number of spatial streams is eight, and the first mapping matrix is $$\begin{bmatrix} +1 & -1 & +1 & +1 & +1 & -1 & +1 & +1 \\ +1 & +1 & -1 & +1 & +1 & +1 & +1 & +1 \\ +1 & +1 & +1 & -1 & +1 & +1 & -1 & -1 \\ -1 & +1 & +1 & +1 & -1 & +1 & +1 & +1 \\ +1 & -1 & +1 & +1 & -1 & +1 & -1 & -1 \\ +1 & +1 & -1 & +1 & -1 & -1 & +1 & -1 \\ +1 & +1 & +1 & -1 & -1 & -1 & -1 & +1 \\ -1 & +1 & +1 & +1 & +1 & -1 & -1 & -1 \end{bmatrix}.$$

4. The method of claim 1, wherein the number of symbols for a TRN subfield is four, and the second mapping matrix is $$\begin{bmatrix} +1 & -1 & +1 & +1 \\ +1 & +1 & -1 & +1 \\ +1 & +1 & +1 & -1 \\ -1 & +1 & +1 & +1 \end{bmatrix}.$$

5. The method of claim 1, wherein the number of symbols for a TRN subfield is eight, the second mapping matrix is:

$$\begin{bmatrix} +1 & -1 & +1 & +1 & +1 & -1 & +1 & +1 \\ +1 & +1 & -1 & +1 & +1 & +1 & +1 & +1 \\ +1 & +1 & +1 & -1 & +1 & +1 & -1 & -1 \\ -1 & +1 & +1 & +1 & -1 & +1 & +1 & +1 \\ +1 & -1 & +1 & +1 & -1 & +1 & -1 & -1 \\ +1 & +1 & -1 & +1 & -1 & -1 & +1 & -1 \\ +1 & +1 & +1 & -1 & -1 & -1 & -1 & +1 \\ -1 & +1 & +1 & +1 & +1 & -1 & -1 & -1 \end{bmatrix}.$$

6. A device configured for transmitting a physical layer protocol data unit (PPDU) in a wireless local area network, the device comprising:

a radio frequency module configured to receive radio signals;

a processor operatively coupled with the radio frequency module; and memory disposed to said processor, said memory comprising instructions that, when executed by said processor, causes the device to:

generate a PPDU including a first short training (ST) field, a first channel estimation (CE) field, a header field, a second ST field, a second CE field, a data field and a training (TRN) field; and transmit the PPDU;

wherein the header field comprises a stream field indicating a number of spatial streams, wherein the second CE field comprises a number of symbols, the number of symbols for the second CE field determined based on the number of spatial streams of the header field, wherein the second CE field generated from a first mapping matrix, the first mapping matrix having a number of columns, the number of columns corresponding to the number of symbols for the second CE field, wherein the TRN field comprises a plurality of TRN subfields, each TRN subfield comprising a number of symbols, each TRN subfield generated from a second mapping matrix having a number of columns, the number of columns of the second mapping matrix corresponding to the number of symbols of each TRN subfield.

7. The device of claim 6, wherein the number of spatial streams is four, and the first mapping matrix is $$\begin{bmatrix} +1 & -1 & +1 & +1 \\ +1 & +1 & -1 & +1 \\ +1 & +1 & +1 & -1 \\ -1 & +1 & +1 & +1 \end{bmatrix}.$$

8. The device of claim 6, wherein the number of spatial streams is eight, and the first mapping matrix is $$\begin{bmatrix} +1 & -1 & +1 & +1 & +1 & -1 & +1 & +1 \\ +1 & +1 & -1 & +1 & +1 & +1 & +1 & +1 \\ +1 & +1 & +1 & -1 & +1 & +1 & -1 & -1 \\ -1 & +1 & +1 & +1 & -1 & +1 & +1 & +1 \\ +1 & -1 & +1 & +1 & -1 & +1 & -1 & -1 \\ +1 & +1 & -1 & +1 & -1 & -1 & +1 & -1 \\ +1 & +1 & +1 & -1 & -1 & -1 & -1 & +1 \\ -1 & +1 & +1 & +1 & +1 & -1 & -1 & -1 \end{bmatrix}.$$

9. The device of claim 6, wherein the number of symbols for a TRN subfield is four, and the second mapping matrix is $$\begin{bmatrix} +1 & -1 & +1 & +1 \\ +1 & +1 & -1 & +1 \\ +1 & +1 & +1 & -1 \\ -1 & +1 & +1 & +1 \end{bmatrix}.$$

10. The device of claim 6, wherein the number of symbols for a TRN subfield is eight, and the second mapping matrix is $$\begin{bmatrix} +1 & -1 & +1 & +1 & +1 & -1 & +1 & +1 \\ +1 & +1 & -1 & +1 & +1 & +1 & +1 & +1 \\ +1 & +1 & +1 & -1 & +1 & +1 & -1 & -1 \\ -1 & +1 & +1 & +1 & -1 & +1 & +1 & +1 \\ +1 & -1 & +1 & +1 & -1 & +1 & -1 & -1 \\ +1 & +1 & -1 & +1 & -1 & -1 & +1 & -1 \\ +1 & +1 & +1 & -1 & -1 & -1 & -1 & +1 \\ -1 & +1 & +1 & +1 & +1 & -1 & -1 & -1 \end{bmatrix}.$$

* * * * *